(12) United States Patent
Gupta et al.

(10) Patent No.: US 11,193,432 B2
(45) Date of Patent: Dec. 7, 2021

(54) GATED IONIZATION CURRENT SUPPLY VOLTAGE

(71) Applicant: Cummins Inc., Columbus, IN (US)

(72) Inventors: Ashish S. Gupta, Columbus, IN (US); Leon A. LaPointe, Columbus, IN (US)

(73) Assignee: Cummins Inc., Columbus, IN (US)

( * ) Notice: Subject to any disclaimer, the term of this patent is extended or adjusted under 35 U.S.C. 154(b) by 266 days.

(21) Appl. No.: 16/475,264

(22) PCT Filed: Dec. 29, 2016

(86) PCT No.: PCT/US2016/069264
§ 371 (c)(1),
(2) Date: Jul. 1, 2019

(87) PCT Pub. No.: WO2018/125155
PCT Pub. Date: Jul. 5, 2018

(65) Prior Publication Data
US 2019/0331042 A1    Oct. 31, 2019

(51) Int. Cl.
*F02D 35/02* (2006.01)
*F02D 41/14* (2006.01)
*F02D 41/00* (2006.01)
*F02P 19/02* (2006.01)
*F02P 13/00* (2006.01)

(52) U.S. Cl.
CPC ........ *F02D 35/021* (2013.01); *F02D 41/14* (2013.01); *F02D 41/1444* (2013.01); *F02D 41/009* (2013.01); *F02P 13/00* (2013.01); *F02P 19/028* (2013.01)

(58) Field of Classification Search
CPC ...... F02D 35/021; F02D 41/009; F02P 13/00; F02P 19/028
See application file for complete search history.

(56) References Cited

U.S. PATENT DOCUMENTS

| 4,442,821 A | 4/1984 | Hamai et al. |
| 4,694,812 A | 9/1987 | Wendt |
(Continued)

OTHER PUBLICATIONS

International Search Report and Written Opinion issued by the ISA/US, Commissioner for Patents, dated Feb. 22, 2017, for International Application No. PCT/US2016/069264; 11 pages.
(Continued)

*Primary Examiner* — Sizo B Vilakazi
*Assistant Examiner* — Mark L. Greene
(74) *Attorney, Agent, or Firm* — Faegre Drinker Biddle & Reath LLP

(57) ABSTRACT

An internal combustion engine, a method of operating the internal combustion engine, and a controller are disclosed. The method may be implemented in part by the controller and comprises determining a shaft angle of an engine shaft; supplying, to an ion sensor fluidly coupled to a combustion chamber of the engine a low voltage at a beginning of a combustion cycle to generate an ion sensor current and a high voltage during an ionization voltage window based at least in part on the shaft angle, wherein the low voltage is configured to prevent premature ignition of fuel in the combustion chamber and the high voltage exceeds the low voltage and is configured to increase the ion sensor current above a current threshold.

17 Claims, 4 Drawing Sheets

(56) References Cited

U.S. PATENT DOCUMENTS

| | | | |
|---|---|---|---|
| 5,060,623 A | 10/1991 | McCoy | |
| 5,672,051 A | 9/1997 | Forgue et al. | |
| 5,676,113 A | 10/1997 | Johansson et al. | |
| 6,089,077 A | 7/2000 | Daniels | |
| 6,408,242 B1* | 6/2002 | Tozzi | F02D 35/021 |
| | | | 324/399 |
| 6,418,785 B1* | 7/2002 | Hatazawa | F02D 35/021 |
| | | | 73/114.08 |
| 6,803,765 B2 | 10/2004 | Ishida et al. | |
| 6,951,201 B2 | 10/2005 | Zhu et al. | |
| 7,063,079 B2 | 6/2006 | Huberts et al. | |
| 7,377,230 B2 | 5/2008 | Conley | |
| 7,475,668 B2 | 1/2009 | Winsor | |
| 7,789,595 B2* | 9/2010 | Tanaya | G01M 15/05 |
| | | | 406/13 |
| 8,176,893 B2 | 5/2012 | Glugla et al. | |
| 8,723,406 B2* | 5/2014 | Kato | H01T 13/04 |
| | | | 313/141 |
| 2005/0257771 A1 | 11/2005 | Nakayama et al. | |
| 2010/0122689 A1 | 5/2010 | Tanaya | |
| 2011/0041803 A1 | 2/2011 | Qu et al. | |
| 2016/0025060 A1* | 1/2016 | Estefanous | F02P 5/145 |
| | | | 123/406.19 |

OTHER PUBLICATIONS

Wikipedia, The Free Encyclopedia, "Ignition timing", available on the Internet as of Jul. 1, 2019 at https://en.wikipedia.org/wiki/Ignition_timing; 5 pages.

Wikipedia, The Free Encyclopedia, Diesel engine, available on the Internet as of Jul. 1, 2019 at https://en.wikipedia.org/wiki/Diesel_engine; 35 pages.

International Preliminary Report on Patentability received for PCT Patent Application No. PCT/US2016/069264, dated Jul. 11, 2019, 10 pages.

* cited by examiner

GATED IONIZATION CURRENT SUPPLY VOLTAGE

CROSS-REFERENCE TO RELATED APPLICATIONS

This application is a National stage application filed under 35 U.S.C. § 371 of International Application No. PCT/US2016/069264, filed on Dec. 29, 2016, which is incorporated herein by reference thereto.

TECHNICAL FIELD

The present disclosure relates to an ionization sensor in an internal combustion engine and a method of using the ionization sensor.

BACKGROUND

Ionized particles may conduct electricity across an electrical gap formed between two contacts, thereby closing an electrical circuit and allowing current to flow through the gap. When the two contacts that form the gap are positioned in or are part of a combustion chamber, the current provides information about the state of combustion in the combustion chamber. The current, or the ionization signal, represents the balance between ion formation and ion recombination, which change with changing pressure, flame formation, and other factors. The ionization signal can be used to determine combustion characteristics.

As the amount of exhaust gas recirculated in the engine increases, or as the air/fuel mixture becomes lean, the ionization signal weakens to the point that it may be difficult or impossible to use. Improved ionization sensing methods and devices are desirable to obtain a useful ionization signal over varying engine operating conditions.

The background to the disclosure is described herein to explain the context of the present invention. This is not to be taken as an admission or a suggestion that any of the material referred to was published, known or part of the common general knowledge in the art to which the present invention pertains, in the United States or in any other country, as at the priority date of any of the claims.

SUMMARY OF DISCLOSED EMBODIMENTS

Embodiments of an internal combustion engine, a method of operating the internal combustion engine, and a controller structured to implement the method are disclosed. Generally, the disclosed embodiments address the problems identified above. The method may be implemented in part by the controller and comprises determining a shaft angle of an engine shaft; supplying, to an ion sensor fluidly coupled to a combustion chamber of the engine a low voltage at a beginning of a combustion cycle to generate an ion sensor current and a high voltage during an ionization voltage window based at least in part on the shaft angle, wherein the low voltage is configured to prevent premature ignition of fuel in the combustion chamber and the high voltage exceeds the low voltage and is configured to increase the ion sensor current above a current threshold. In some examples, the low voltage equals zero volts.

In some embodiments, a method of operating an internal combustion engine comprising a combustion chamber and an ion sensor fluidly coupled with the combustion chamber is provided, the method comprising: supplying a high voltage to the ion sensor during a combustion cycle at a first time based on a crankshaft angle of a crankshaft of the internal combustion engine, wherein the high voltage is greater than 400 volts and is configured to generate an ion sensor current above a current threshold; and discontinuing supply of the high voltage to the ion sensor at a second time based on the crankshaft angle during the combustion cycle.

In some embodiments, a controller for an internal combustion engine comprises control logic structured to supply a low voltage to the ion sensor during a combustion cycle of the internal combustion engine, wherein the low voltage is configured to prevent premature ignition of fuel in the combustion chamber; after supply of the low voltage, supply a high voltage to the ion sensor during the combustion cycle at a first time based on a crankshaft angle of a crankshaft of the internal combustion engine, wherein the high voltage exceeds the low voltage and is configured to increase an ion sensor current above a current threshold; and discontinue supply of the high voltage to the ion sensor at a second time based on the crankshaft angle during the combustion cycle.

BRIEF DESCRIPTION OF THE DRAWINGS

The features of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated to better illustrate and explain the embodiments.

DETAILED DESCRIPTION OF DISCLOSED EMBODIMENTS

Figure 1:
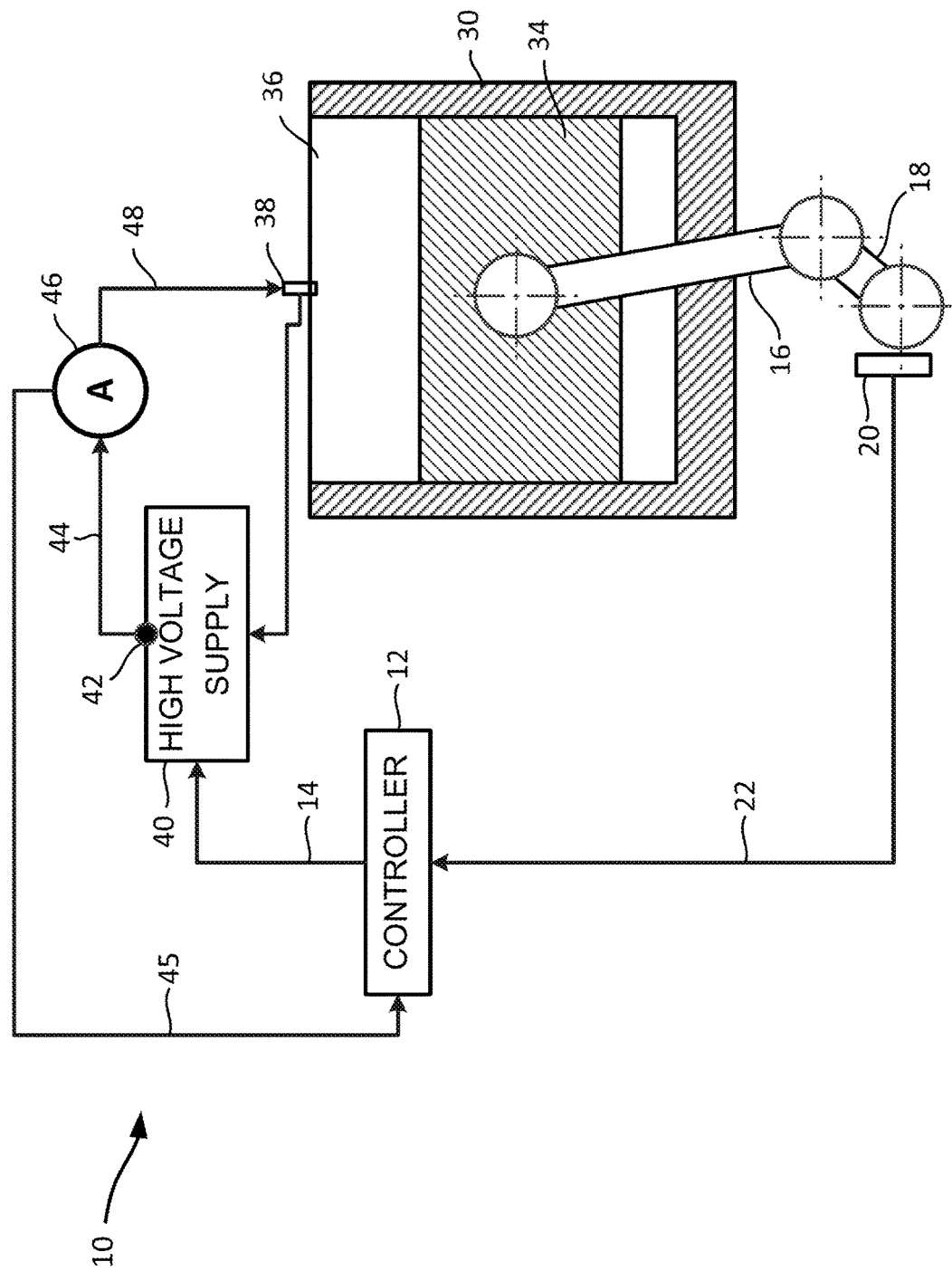
FIG. 1 is a block diagram of a portion of an embodiment of an engine.

For the purpose of promoting an understanding of the principles of the invention, reference will now be made to the embodiments illustrated in the drawings and described below. The disclosed embodiments are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Except where a contrary intent is expressly stated, the following terms have the following meanings:

"About" as used herein when referring to a measurable value such as an amount, a temporal duration, and the like, is meant to encompass the exact numerical value as though it had been recited without the term "about".

The transitional terms "comprises," "comprising," "containing," and "having" and the like mean "includes," "including," and the like, are inclusive or open ended terms and do not exclude additional, unspecified elements or method steps. By contrast, the transitional term "consisting" is a closed term which does not permit addition of unspecified terms.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Unless an order is expressly or inherently claimed, actions recited in the claims may be performed in any order, and in particular an order different than the order presented. The depictions in the accompanying figures do not necessarily require a particular order or sequential order.

Except where a contrary intent is expressly stated, terms are used in their singular form for clarity and are intended to include their plural form.

Occurrences of the phrase "in one embodiment," or "in one aspect," herein do not necessarily all refer to the same embodiment or aspect.

Figure 2:
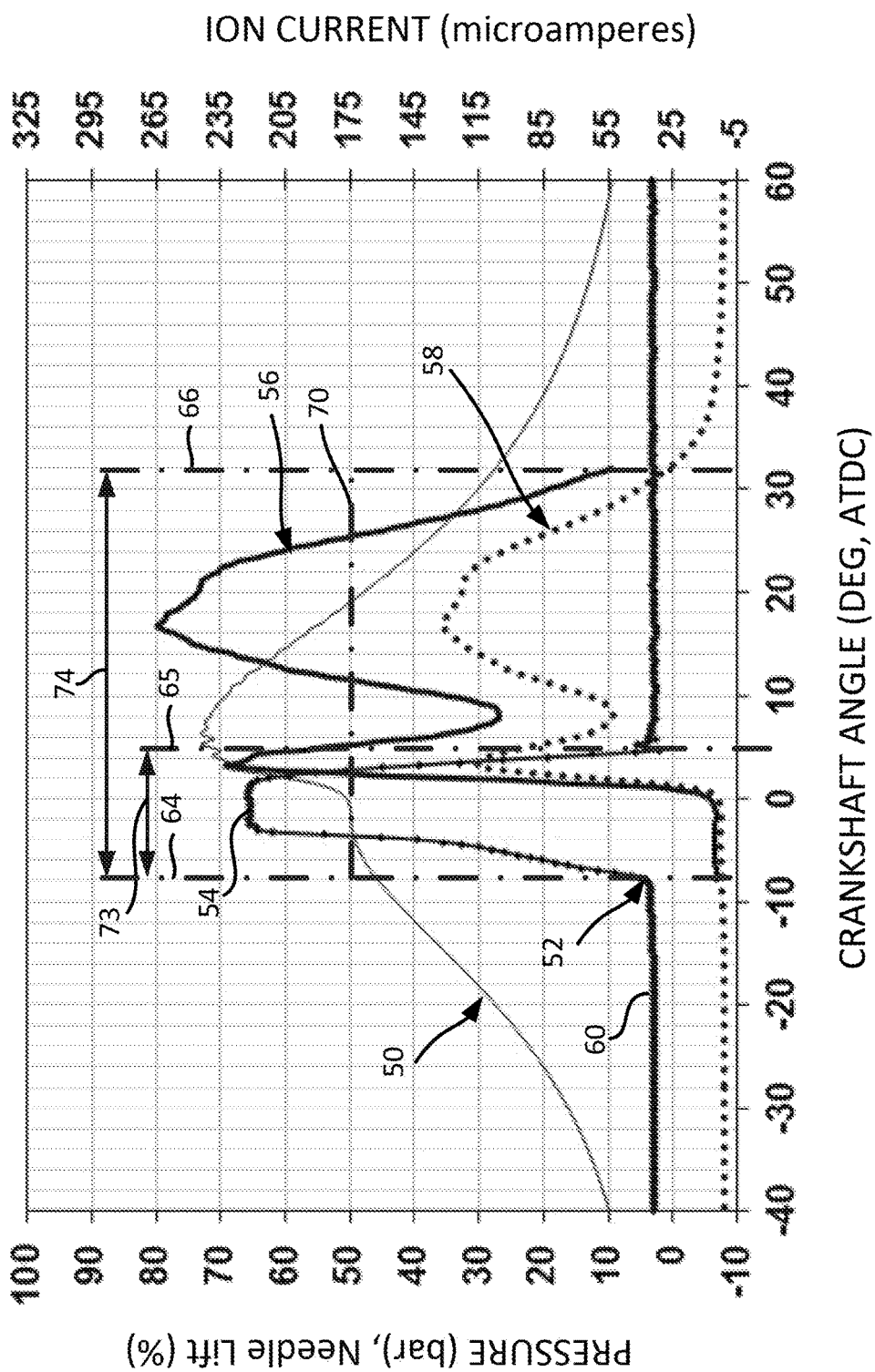
FIG. 2 is a graph of an ionization signal based on an embodiment of a method of using an ion sensor in the engine of FIG. 1.

FIG. 1 is a block diagram of a portion of an engine 10. Engine 10 comprises a combustion chamber 36 in an engine block 30 and a piston 34 traversing a length of combustion chamber 36 in a reciprocating manner thereby actuating a connecting rod 16 to rotate a crankshaft 18 of engine 10. A sensor 20 is positioned near crankshaft 18 to determine its angle of rotation and communicate the angle of rotation to a controller 12 over a communication line 22. Communication line 22 conveys a signal which may be analog or digital and represents an angle of rotation value. Controller 12 comprises control logic structured to determine and communicate an instruction for a high voltage supply 40 over a communication line 14. Communication line 14 conveys a signal which may be analog or digital and represents an ion sensor voltage value. High voltage supply 40 comprises an output 42 providing a high voltage signal to an ion sensor 38 over a line 44, 48. An ammeter is serially connected between high voltage supply 40 and ion sensor 38 and measures current flowing through ion sensor 38, which is depicted in FIG. 2 as ion sensor current 56. A level of ion sensor current 56 is provided to controller 12 over a line 45. Controller 12 may use or convey the signal to determine the mass fraction of fuel burned in the combustion chamber as a function of time relative to a crankshaft angle, piston position in the combustion chamber, the pressure in the combustion chamber, a location of peak cylinder pressure, or any other combustion characteristics useful to improve operation of engine 10. Ion sensor 38 may comprise one or more of a spark plug, a glow plug, a pressure transducer, a fuel injector, or a stand-alone transducer. As used herein a stand-alone transducer is a transducer performing only the function of providing a current path for the sensor current. By contrast, the spark plug, glow plug, pressure transducer, and fuel injector, when operable as ion sensors, perform that function and a main function, such as injecting fuel or generating a spark.

Engine 10 can be a four-cycle engine. A four-cycle engine includes intake, compression, power, and exhaust cycles. The crankshaft rotates through two complete revolutions to cause piston 34 to move in an out of combustion chamber 36 twice. As is well known, during the intake cycle piston 34 begins at top dead center (TDC) and descends until it reaches bottom dead center (BDC), increasing the volume of combustion chamber 36 with intake valves open and exhaust valves closed, during which time a gas charge is provided to combustion chamber 36. During the compression cycle, piston 34 moves from BDC to TDC with both intake and exhaust valves closed, compressing the gas charge. At the end of the compression cycle and/or the beginning of the power cycle, while piston 34 is close to TDC, the compressed gas charge is ignited. The resulting pressure from the combustion of the compressed gas charge forces the piston back down toward BDC. As used herein, up/top means movement toward or position near the valve header and down/bottom means movement away or position distally away from the valve header and toward/near crankshaft 18.

Figure 4:
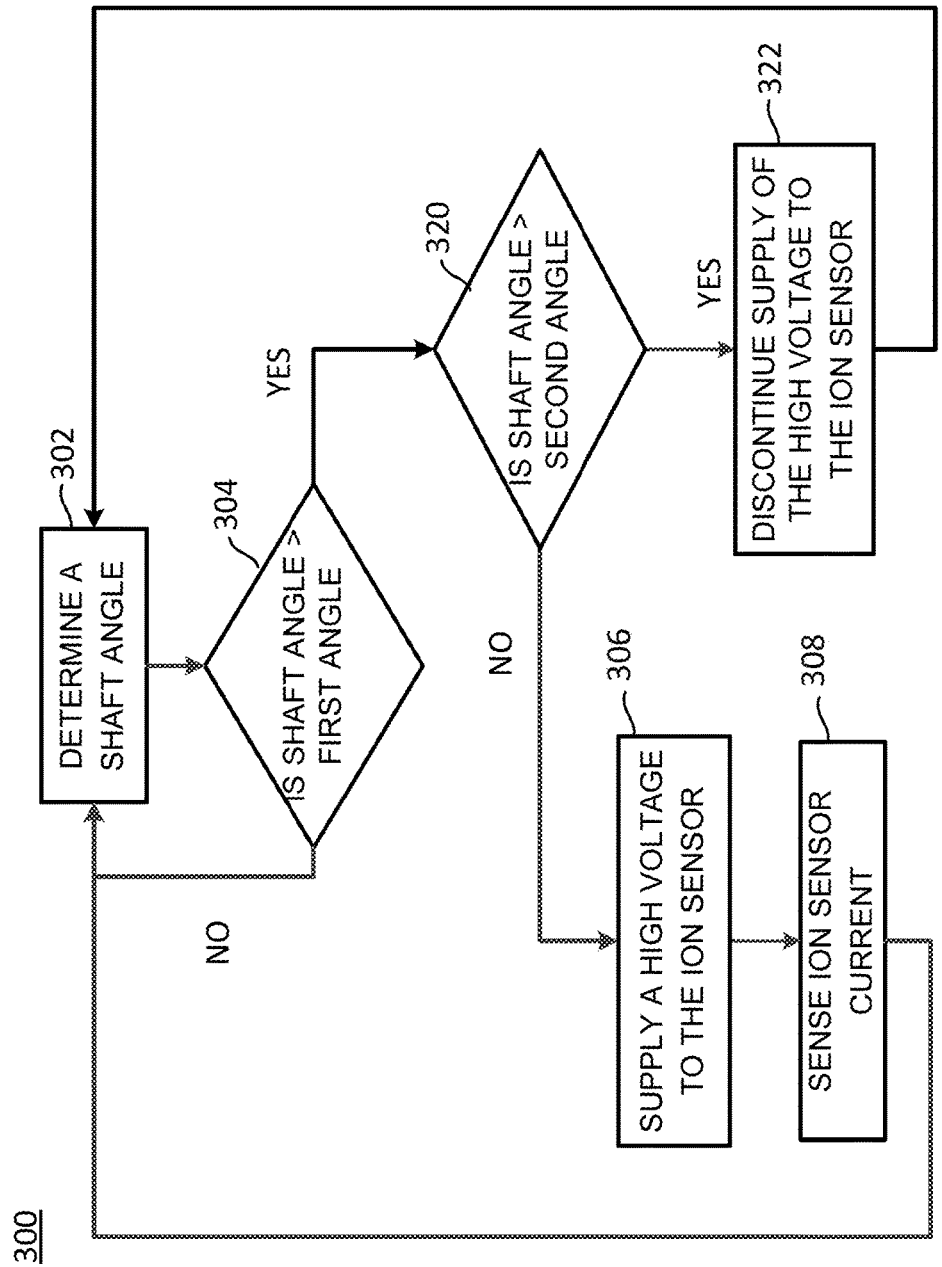
FIG. 4 is a flowchart of an embodiment of a method of using an ion sensor.

FIG. 2 is a graph of an ionization signal 56 based on an embodiment of a method of using an ion sensor depicted in FIG. 4. The graph also shows, in contrast, an ionization signal 58 resulting from prior methods of using the ion sensor. Additionally, the graph illustrates a combustion pressure signal 50 as a function of crankshaft angle, an ion sensor voltage 52 applied to the ion sensor, wherein ion sensor voltage 52 includes a low voltage 60 and a high voltage 54. Ionization signal 56 results from the application of ion sensor voltage 52 to the ion sensor, and ionization signal 58 results from the application of the low ion sensor voltage only to the ion sensor. The graph illustrates that the addition of high voltage 54 raises the highest ion current from about 35 microamperes (at between 10-20 degrees) in ionization signal 58 to about 265 microamperes in ionization signal 56. An ion current value of 35 microamperes is susceptible to noise and difficult to distinguish therefrom. Such low ionization signals may result, for example, from high exhaust gas recirculation (EGR), or high or lean air/fuel mixture ratios (AFR). In some embodiments, the controller causes the high voltage supply to supply a voltage sufficient to exceed an ionization current threshold. In some examples, the ionization current threshold comprises 175 microamperes.

In the present embodiment, a high voltage source electrically coupled to the ion sensor generates a voltage signal at a low value until the crankshaft angle reaches a first crankshaft angle and then increases the voltage signal to a high value corresponding to high voltage 54. The low voltage value is selected to prevent causing ignition of the gas charge and may be equal to zero volts. At a second crankshaft angle the high voltage source decreases the voltage signal, for example to the low voltage 60. The first and second crankshaft angles, illustratively angles 64, 65, define a high voltage window 73 configured to increase the ion current above a minimum current threshold 70, illustratively 175 microamperes. The high voltage window is smaller than an ionization window 74 defined by angles 64 and 66, during which time ionization in the combustion chamber occurs. In the present example, high voltage window 73 represents about 12 crankshaft angle degrees. Example low voltage values include 30, 40, 50, 60, up to 400 volts, any voltage therebetween. Example high voltage values include 400, 500, 600, 750, 1,000, 1,500, up to 3,000 volts, and any voltage therebetween. In one variation, the low voltage is selected to result in a maximum ion current less than 145 microamperes and the high voltage is selected to result in a maximum ion current greater than 175 microamperes.

Figure 3:
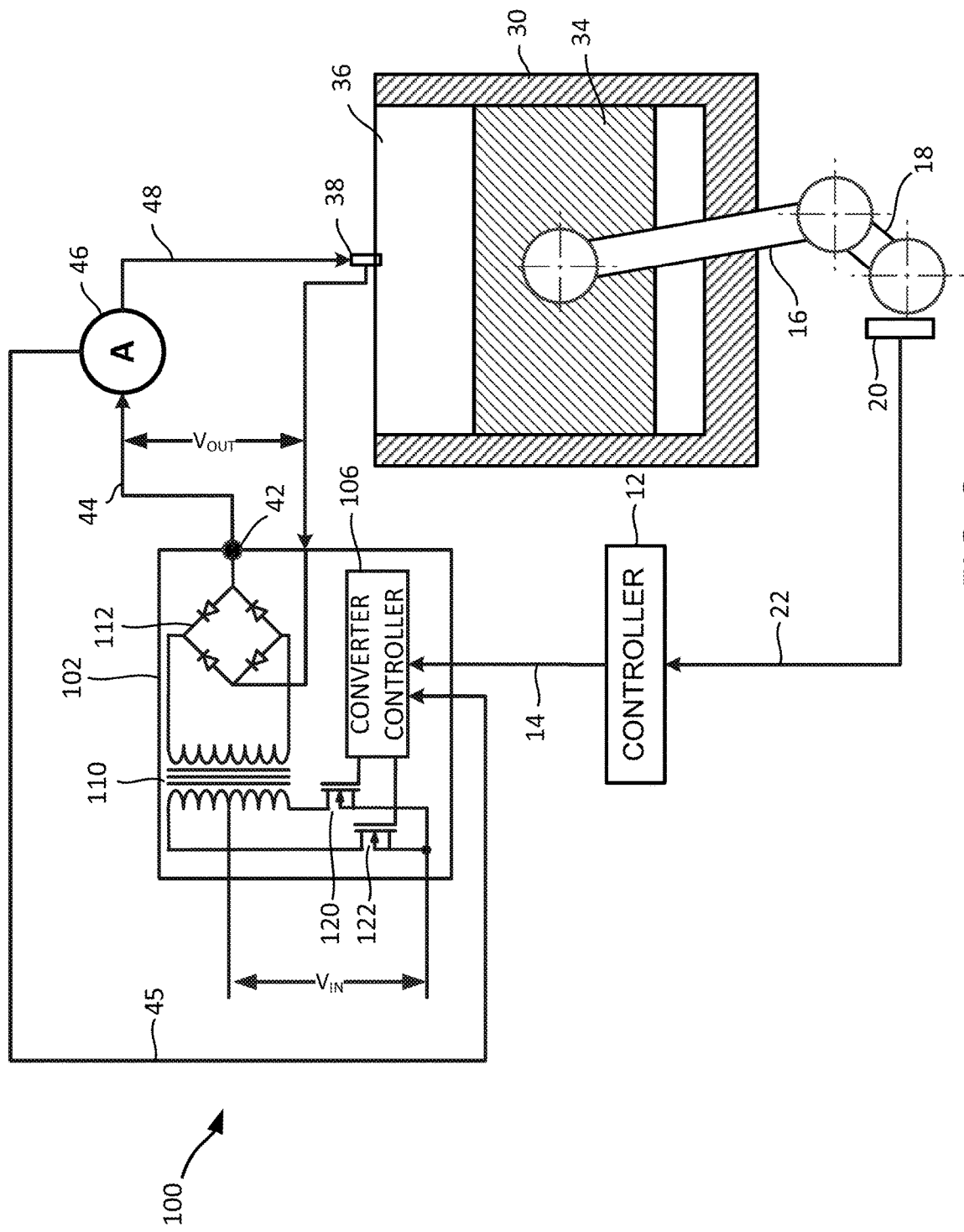
FIG. 3 is a schematic diagram of a portion of another embodiment of an engine.

FIG. 3 is a schematic diagram of a portion of an engine 100. Components of engine 100 that function in the same manner as components of engine 10 are denoted with the same numbers. As disclosed with reference with FIG. 1, engine 10 comprises controller 12, which comprises control logic structured to determine and communicate an instruction for high voltage supply 40 over a communication line 14. In the present embodiment, a high voltage supply 102 is provided which includes a converter controller 106 coupled to a rectification circuit 112. Converter controller 106 switches power switches 120, 122, which are coupled to direct-current (DC) voltage $V_{IN}$, to generate an alternating-current (AC) voltage to a transformer 110. A secondary winding of transformer 110 supplies rectification circuit 112 a boosted AC voltage which after rectification becomes $V_{OUT}$, the voltage supplied to the ion sensor. Converter controller 106 also includes control logic and may therefore be structured to cooperate with controller 12. In one embodiment, controller 12 provides signals to converter controller 106 indicative of the crankshaft angle and converter controller 106 is programmed to determine, based on the engine type (e.g. spark ignition or compression ignition), the type of fuel being consumed by the engine, EGR percentage, AFR, and any other parameters, the angles signifying the beginning and end of the high voltage window. Control logic in converter controller 106 is programmed to increase $V_{OUT}$ from the low to the high voltage based on the high voltage window parameters. Control logic in converter controller 106 may also be programmed to supply $V_{OUT}$ based on the ion sensor current to maintain the current above a minimum current threshold. $V_{OUT}$ may be adjusted by changing a duty-cycle of power switches 120, 122 as is known in the art. Of course, any known switching power supply may be utilized. At least some of the duties of controller 12 and converter controller 106 may be distributed between them and additional controllers.

In another embodiment, controller 12 provides signals to converter controller 106 indicative of the desired voltage output or desired current and converter controller 106 is programmed to determine the switching pattern of power switches 120, 122 to generate the desired voltage or current. The signals may be generated dynamically based on present engine operating conditions. Controller 12 may determine the desired voltage output or desired current directly or indirectly from the position of the crankshaft.

In certain embodiments, a controller includes one or more modules structured to functionally execute the operations of the controller. The description herein including modules emphasizes the structural independence of certain aspects of the controller, and illustrates one grouping of operations and responsibilities of the controller. Other groupings that execute similar overall operations are understood to be within the scope of the present application. Modules may be implemented in hardware and/or as processing instructions on a non-transient computer readable storage medium. Modules may be distributed across various hardware or computer based components. Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an operational amplifier integrated circuit, analog control elements (springs, filters, integrators, adders, dividers, gain elements), and/or digital control elements.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or pulse-width-modulation signal) indicative of the value, receiving a computer generated parameter indicative of the value, reading the value from a memory location on a non-transient machine readable storage medium, receiving the value as a run-time parameter by any means known in the art, and/or by receiving a value by which the interpreted parameter can be calculated, and/or by referencing a default value that is interpreted to be the parameter value.

The term "control logic" as used herein includes software and/or firmware executing on one or more programmable processors, application-specific integrated circuits, field-programmable gate arrays, digital signal processors, hard-wired logic, or combinations thereof. For example, in various embodiments controller 12, 106 may comprise or have access to the control logic. Therefore, in accordance with the embodiments, various logic may be implemented in any appropriate fashion and would remain in accordance with the embodiments herein disclosed. A non-transitory machine-readable medium comprising control logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory machine-readable medium, or memory, may include random access memory (RAM), read-only memory (ROM), erasable programmable read-only memory (e.g., EPROM, EEPROM, or Flash memory), electronically programmable ROM (EPROM), magnetic disk storage, and any other medium which can be used to carry or store processing instructions and data structures and which can be accessed by a general purpose or special purpose computer or other processing device.

One of skill in the art, having the benefit of the disclosures herein, will recognize that controllers 12, 106 are structured to perform operations that improve various technologies and provide improvements in various technological fields. Without limitation, example and non-limiting technology improvements include improvements in combustion performance of internal combustion engines, improvements in emissions performance, after-treatment system regeneration, engine torque generation and torque control, engine fuel economy performance, improved durability of exhaust system components for internal combustion engines, and engine noise and vibration control. Without limitation, example and non-limiting technological fields that are improved include the technological fields of internal combustion engines, fuel systems therefore, after-treatment systems therefore, air handling devices therefore, and intake and exhaust devices therefore.

An embodiment of a method of using an ion sensor will now be described with reference to a flowchart 300 depicted in FIG. 4. The method may be implemented by controller 12, 106. The method begins at 302 by determining a shaft angle. The shaft angle may be a crankshaft angle and is indicative of the position of the piston in the combustion chamber.

The method continues at 304 by determining if the shaft angle exceeds a first angle. The first angle corresponds to the beginning of the high voltage window. If the shaft angle is less than the first angle, the method continues at 302. Otherwise the method continues, at 320, by determining if the shaft angle exceeds a second angle. The second angle corresponds to the end of the high voltage window. If the shaft angle is less than the second angle, the method continues at 306 by supplying a high voltage to the ion sensor and, subsequently, sensing the ion sensor current at 308. Otherwise the method continues at 322 by discontinuing supply of the high voltage to the ion sensor.

In a variation of the present embodiment, the control logic determines the duration of the high voltage window based on engine parameters such as revolutions per minute without determining the second angle.

In another variation of the present embodiment, the control logic determines the start of the high voltage window based on a combustion status signal representing a status of combustion, without measuring the first angle. For example, the combustion status signal may be a spark ignition signal. The combustion status signal may also be a signal indicative of the start of ignition in a compression ignition engine. Of course the spark ignition signal and the start of ignition signal may be based on the position of the crankshaft, therefore the first angle is indirectly implicated in the determination.

While this specification contains specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples). Thus, particular implementations of the invention have been described. Other implementations are within the scope of the following claims. In some cases, actions recited in the claims may be performed in a different order and still achieve desirable results.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed:

1. A method of operating an internal combustion engine comprising a combustion chamber and an ion sensor fluidly coupled with the combustion chamber, the method comprising:

supplying a high voltage to the ion sensor during a combustion cycle at a first time based on a crankshaft angle of a crankshaft of the internal combustion engine, wherein the high voltage is greater than 400 volts and is configured to generate an ion sensor current above a current threshold; and discontinuing supply of the high voltage to the ion sensor at a second time based on the crankshaft angle during the combustion cycle;

wherein the high voltage is equal to or greater than 1,000 volts.

2. The method of claim 1, further comprising supplying a low voltage to the ion sensor before supplying the high voltage, wherein the low voltage is configured to prevent premature ignition of fuel in the combustion chamber.

3. The method of claim 1, wherein the high voltage is equal to or greater than 1,000 volts and less than 3,000 volts.

4. The method of claim 1, wherein the first time and the second time define the high voltage window, and supplying a high voltage comprises supplying the high voltage during the high voltage window and not at other times during the combustion cycle.

5. The method of claim 4, wherein a duration of the high voltage window is greater than 8 degrees and less than 90 degrees.

6. The method of claim 5, wherein the duration of the high voltage window is between 10 and 20 degrees.

7. An internal combustion engine comprising:
a block including a combustion chamber;
an ion sensor fluidly coupled with the combustion chamber;
a crankshaft;
a high voltage supply output electrically coupled to the ion sensor; and
a controller comprising control logic configured to:
supply a low voltage to the ion sensor during a combustion cycle of the internal combustion engine, wherein the low voltage is configured to prevent premature ignition of fuel in the combustion chamber;
after supply of the low voltage, supply a high voltage to the ion sensor during the combustion cycle at a first time based on a crankshaft angle of the crankshaft of the internal combustion engine, wherein the high voltage exceeds the low voltage and is configured to increase an ion sensor current above a current threshold; and
discontinue supply of the high voltage to the ion sensor at a second time based on the crankshaft angle during the combustion cycle;
wherein the high voltage is proportional to one of an exhaust gas recirculation percentage or an air-fuel ratio of an air-fuel mixture in the combustion chamber.

8. The internal combustion engine of claim 7, wherein the ion sensor comprises an anode coupled to the high voltage supply output and a cathode electrically coupled to the block of the internal combustion engine.

9. The internal combustion engine of claim 8, wherein the ion sensor comprises a spark plug, a glow plug, a pressure transducer, a fuel injector, or a stand-alone transducer.

10. The internal combustion engine of claim 7, further comprising a high voltage supply comprising the high voltage supply output.

11. The internal combustion engine of claim 10, wherein the high voltage supply comprises a transformer having a primary coil coupled to a power switch, wherein the controller is configured to cause the power switch to switch an input voltage at a duty cycle configured to boost the input voltage to generate the high voltage.

12. A controller for an internal combustion engine, the controller comprising control logic structured to:
   supply a low voltage to an ion sensor during a combustion cycle of the internal combustion engine, wherein the low voltage is configured to prevent premature ignition of fuel in a combustion chamber;
   after supply of the low voltage, supply a high voltage to the ion sensor during the combustion cycle at a first time based on a crankshaft angle of a crankshaft of the internal combustion engine, wherein the high voltage exceeds the low voltage and is configured to increase an ion sensor current above a current threshold; and
   discontinue supply of the high voltage to the ion sensor at a second time based on the crankshaft angle during the combustion cycle;
   wherein the high voltage is proportional to one of an exhaust gas recirculation percentage or an air-fuel ratio of an air-fuel mixture in the combustion chamber.

13. The controller of claim 12, wherein the low voltage comprises 0 volts.

14. A method of operating an internal combustion engine comprising a combustion chamber and an ion sensor fluidly coupled with the combustion chamber, the method comprising:
   supplying a high voltage to the ion sensor during a combustion cycle at a first time based on a crankshaft angle of a crankshaft of the internal combustion engine, wherein the high voltage is greater than 400 volts and is configured to generate an ion sensor current above a current threshold; and
   discontinuing supply of the high voltage to the ion sensor at a second time based on the crankshaft angle during the combustion cycle;
   wherein the first time and the second time define a high voltage window, and supplying the high voltage comprises supplying the high voltage during the high voltage window and not at other times during the combustion cycle; and
   wherein a duration of the high voltage window is between 10 and 40 degrees.

15. A method of operating an internal combustion engine comprising a combustion chamber and an ion sensor fluidly coupled with the combustion chamber, the method comprising:
   supplying a high voltage to the ion sensor during a combustion cycle at a first time based on a crankshaft angle of a crankshaft of the internal combustion engine, wherein the high voltage is greater than 400 volts and is configured to generate an ion sensor current above a current threshold; and
   discontinuing supply of the high voltage to the ion sensor at a second time based on the crankshaft angle during the combustion cycle;
   wherein the internal combustion engine is a compression ignition engine, and wherein the first time occurs at or after a start of ignition in the combustion chamber.

16. A method of operating an internal combustion engine comprising a combustion chamber and an ion sensor fluidly coupled with the combustion chamber, the method comprising:
   supplying a high voltage to the ion sensor during a combustion cycle at a first time based on a crankshaft angle of a crankshaft of the internal combustion engine, wherein the high voltage is greater than 400 volts and is configured to generate an ion sensor current above a current threshold; and
   discontinuing supply of the high voltage to the ion sensor at a second time based on the crankshaft angle during the combustion cycle;
   wherein the high voltage is configured to maintain the ion sensor current flowing through the ion sensor above the current threshold; and
   wherein the current threshold is greater than 100 microamperes.

17. The method of claim 16, wherein the current threshold is greater than 145 microamperes.

* * * * *